(12) United States Patent
Won

(10) Patent No.: US 6,204,667 B1
(45) Date of Patent: Mar. 20, 2001

(54) ELECTROMAGNETIC GRADIOMETER HAVING A PRIMARY DETECTOR AND A PLURALITY OF SECONDARY DETECTORS

(75) Inventor: I. J. Won, Raleigh, NC (US)

(73) Assignee: Geophex, Ltd., Raleigh, NC (US)

( * ) Notice: Subject to any disclaimer, the term of this patent is extended or adjusted under 35 U.S.C. 154(b) by 0 days.

(21) Appl. No.: 09/045,362

(22) Filed: Mar. 18, 1998

(51) Int. Cl.$^7$ .............................. G01V 3/08; G01V 3/10; G01N 27/72; G01R 33/12
(52) U.S. Cl. ........................ 324/329; 324/239; 324/243
(58) Field of Search .................................. 324/326, 327, 324/328, 329, 239, 243, 66, 67

(56) References Cited

U.S. PATENT DOCUMENTS

| | | | |
|---|---|---|---|
| 3,826,973 | * 7/1974 | Pflaum | ................................ 324/329 |
| 5,065,099 | 11/1991 | Sinclair et al. | . |
| 5,668,475 | 9/1997 | Orban et al. | . |

\* cited by examiner

*Primary Examiner*—Walter E Snow
(74) *Attorney, Agent, or Firm*—Coats & Bennett, PLLC

(57) ABSTRACT

An electromagnetic gradiometer generates a time varying primary electromagnetic field, such as by use of a transmitter coil attached to a waveform generator. The primary electromagnetic field induces a responsive, relatively weak, time varying secondary electromagnetic field about a hidden object. The combined primary and secondary electromagnetic field is measured simultaneously at two spaced apart detectors, such as at two distinct receiver coils. The detectors are configured such that they detect the primary field in equal magnitudes but in opposite sense and connected in series such that the primary electromagnetic field is automatically nulled. The difference in the secondary electromagnetic field measured at the two points is divided by the distance between the detectors to determine the electromagnetic field gradient therebetween. The electromagnetic gradiometer may have a pair of detectors for measuring the electromagnetic gradient along one line or may have an array of detectors for measuring a plurality of electromagnetic gradients by switching or otherwise pairing the detectors.

16 Claims, 5 Drawing Sheets

ELECTROMAGNETIC GRADIOMETER HAVING A PRIMARY DETECTOR AND A PLURALITY OF SECONDARY DETECTORS

FIELD OF INVENTION

The present invention relates to methods for measuring electromagnetic fields, and more particularly to a method of measuring electromagnetic field gradients.

BACKGROUND OF THE INVENTION

Electromagnetic induction has long been used for detection of hidden and buried metal objects such as mines and buried ordinance and for security checks, treasure hunting, and earth resource exploration. The method involves generating a primary electromagnetic field from a transmitter coil that induces a current in nearby conductive objects. This induced current produces a relatively weak secondary electromagnetic field that is detected by a receiver coil. The measured secondary electromagnetic field is then analyzed to detect, and sometimes characterize, buried or hidden objects.

Existing metal detectors employ many well-known transmitter and receiver coil configurations. One consideration in coil configuration is that the primary electromagnetic field generated by the transmitter coil not only induces a secondary electromagnetic field in the hidden object but also induces an electromagnetic field in the receiver coils. Because the object's induced secondary electromagnetic field is relatively weak compared to the primary electromagnetic field, the primary electromagnetic field will tend to mask the secondary electromagnetic field unless compensated for. This compensation is referred to as nulling or balancing. Ideally, nulling the primary electromagnetic field results in the metal detector indicating a field strength of zero, or null, in free space.

One approach to nulling is to employ multiple bucking coils. As shown in the patent to Won, U.S. Pat. No. 5,557,206, the disclosure of which is expressly incorporated herein by reference, another approach is to concentrically locate the receiver coil within the transmitter coils such that the direct electromagnetic field is automatically nulled.

While the approaches above present methods for measuring electromagnetic field strength, none measure electromagnetic field gradients. The measurement of electromagnetic field gradients is useful in characterizing hidden objects and provides another tool for determining the size, shape, or composition of the objects. Thus, there remains a need for method of measuring electromagnetic field gradients.

SUMMARY OF THE INVENTION

The present invention provides a method and apparatus for measuring electromagnetic field gradients. The electromagnetic gradiometer of the present invention generates a time varying primary electromagnetic field, such as by use of a transmitter coil attached to a waveform generator. The primary electromagnetic field induces a responsive, relatively weak, time varying secondary electromagnetic field about a hidden object. The combined primary and secondary electromagnetic field is measured simultaneously at two spaced apart detectors, such as at two distinct receiver coils. The detectors are configured such that they detect the primary field in equal magnitudes but in opposite sense and connected in series such that the primary electromagnetic field is automatically nulled. The difference in the secondary electromagnetic field measured at the two points is divided by the distance between the detectors to determine the electromagnetic field gradient therebetween. In one embodiment, there are two detectors which are axially aligned with the transmitter coil and symmetrically located thereabout. Alternatively, an array of detectors may be used to measure a plurality of electromagnetic field gradients by switching or otherwise pairing the detectors.

DETAIL DESCRIPTION

The method of the present invention includes inducing an electromagnetic field in an object and measuring the strength of the secondary electromagnetic field at two spaced apart locations simultaneously. Based on the secondary electromagnetic field strength at the two locations and the known distance between the two locations, an electromagnetic field gradient is determined. Using this gradient, information relative to the object's material composition, size, shape, conductivity, and electromagnetic permeability may be obtained.

Figure 1:
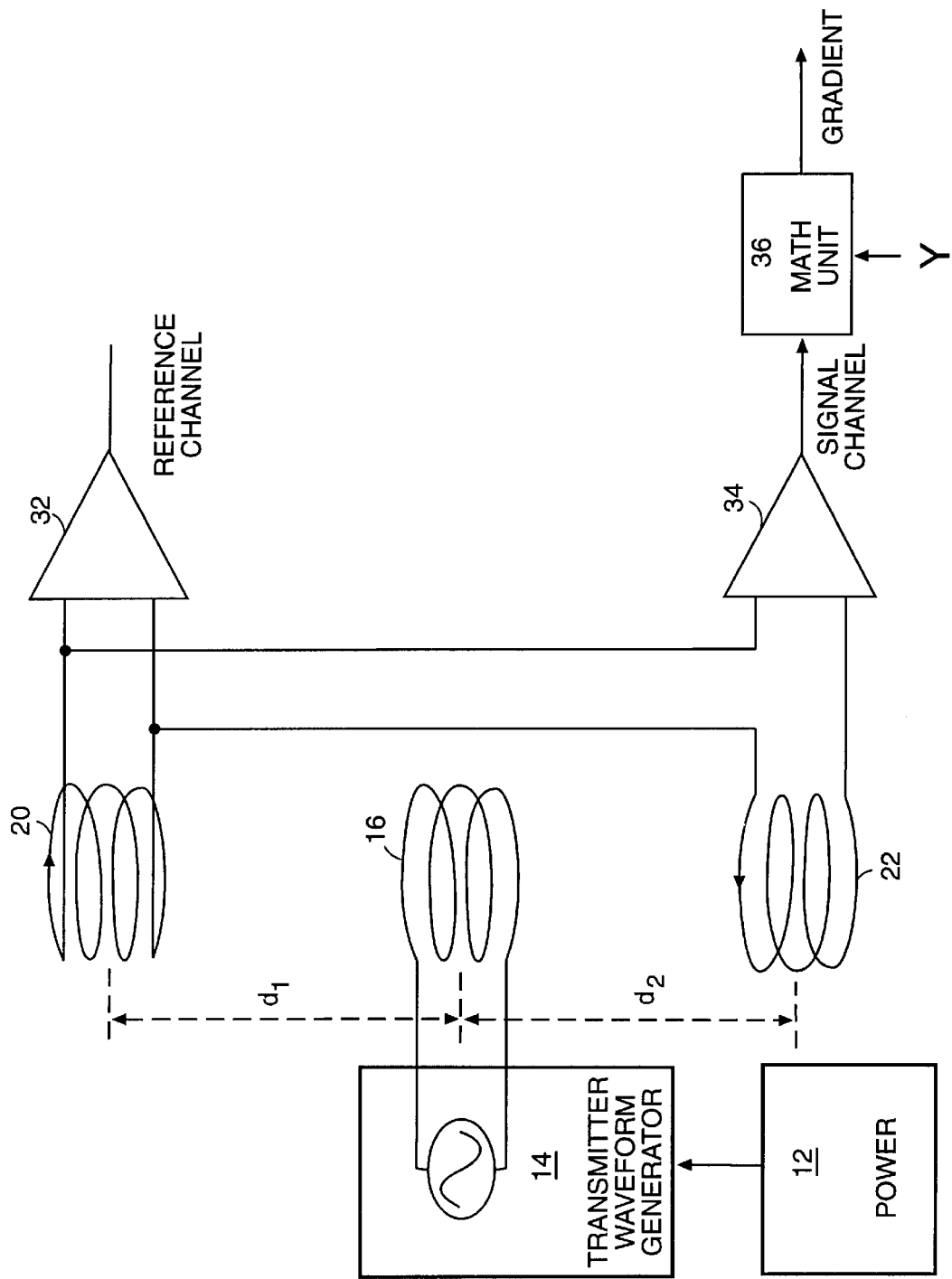
FIG. 1 is a schematic of one embodiment of the electromagnetic gradiometer of the present invention.

In one preferred embodiment, shown in FIG. 1, the electromagnetic gradiometer 10 of the present invention includes a power source 12, waveform generator 14, a transmitter coil 16, a pair of receiver coils 20,22 and a pair of amplifiers 32,34. The power source 12 provides power to the waveform generator 14 and the amplifiers 32,34. The power source 12 may be external to the gradiometer 10 or may be internal, such as a battery or battery pack. The waveform generator 14 takes the power from the power source 12 and generates a time-varying electrical signal which is sent to the transmitter coil 16. The transmitter coil 16 generates a time-varying primary electromagnetic field based on the time-varying electrical signal from the waveform generator 14. The generation of this time-varying primary electromagnetic field is well known in the art.

The primary electromagnetic field induces a relatively weak secondary electromagnetic field in nearby electrically or magnetically permeable objects. This secondary field is detected, or received, at the receiver coils 20,22. In addition, the receiver coils 20,22 also detect the primary electromagnetic field generated by the transmitter coil 16. The output from each receiver coil 20,22 is the sum of the combined primary and secondary field strengths at the particular receiver coil location. As will be explained in more detail below, the receiver coils 20,22 are designed such that their combined outputs balance out, or null, the effect of the primary electromagnetic field. As shown in FIG. 1, the first amplifier 32 amplifies the output signal from the first receiver coil 20 so as to generate a reference measurement of the primary electromagnetic field, called the reference channel. This reference measurement will include some portion of the secondary electromagnetic field, but due to their relative magnitudes, this error may be ignored. The second amplifier 34 amplifies the combined output signals from the first receiver coil 20 and the second receiver coil 22 so as to generate a measurement of the secondary electromagnetic field, called the signal channel.

The present invention relies on the proper placement and configuration of the receiver coils 20,22 to null the primary electromagnetic field. This is principally accomplished by configuring the receiver coils 20,22 so that they have opposite sense from each other. Assuming the transmitter coil 16 and receiver coils 20,22 are in free space, that is far away from electromagneticially conductive or electromagneticially permeable objects, the measured electromagnetic field strengths in the receiver coils 20,22 will be the strength of the primary electromagnetic field. If the measured field strength at two locations are equal but have opposite sense, and these measurements are combined, then the resulting primary electromagnetic field measurement should be zero.

If the transmitter coil 16 and a receiver coil 20 are arranged as shown in FIG. 1, then the primary electromagnetic field $H_p$, assuming a time-dependence of $e^{j\omega t}$ where $\omega$ is the angular frequency, generated by the transmitter coil 16 at a distance d along the transmitter coil 16 axis can be expressed as $$H_p(d) = M_T/(2\pi d^3) \quad (1)$$

where $M_T$ is the transmitter magnetic moment, which is a product of the drive current $I_T$, winding area $A_T$, and number of turns $n_T$ in the transmitter coil 16 according to the formula $M_T = I_T \times A_T \times n_T$.

The voltage output V from a receiver coil 20 is the time derivative of the total magnetic flux across the receiver coil 20, which can be expressed for the case shown in FIG. 1 as $$V = \omega \times \mu_0 \times H_p I \times n_R \times A_R \quad (2)$$

where $n_R$ is the number of turns of the receiver coil 20, $A_R$ is the area of the receiver coil 20, and $\mu_0$ is the magnetic susceptibility of free space ($4\pi \times 10^{-7}$ henry/m).

When two receiver coils 20,22 are placed as shown in FIG. 1, their combined output becomes zero when the voltage from each coil, expressed by equation 2, is equal in magnitude, but opposite in sense. This condition is met when $$n_1 \times A_1/d_1^3 = n_2 \times A_2/d_2^3 \quad (3)$$

where $n_1$ is the number of turns in the first receiver coil 20, $A_1$ is the area of the first receiver coil 20, $d_1$ is the distance from the transmitter coil 16 to the first receiver coil 20, $n_2$ is the number of turns in the second receiver coil 22, $A_2$ is the area of the second receiver coil 22, and $d_2$ is the distance from the transmitter coil 16 to the second receiver coil 22.

An analysis of equation (3) reveals that there are a variety of receiver coil location and configuration combinations that may satisfy the null conditions. The simplest combination is that where the receiver coils 20,22 have the same physical configuration, are oriented opposite from each other, and are placed symmetrically about the transmitter coil 16 (as shown in FIG. 1). Such a symmetrical arrangement helps promote thermal stability as the two receiver coils 20,22 will move with respect to the transmitter coil 16 at the same rate.

Figure 2:
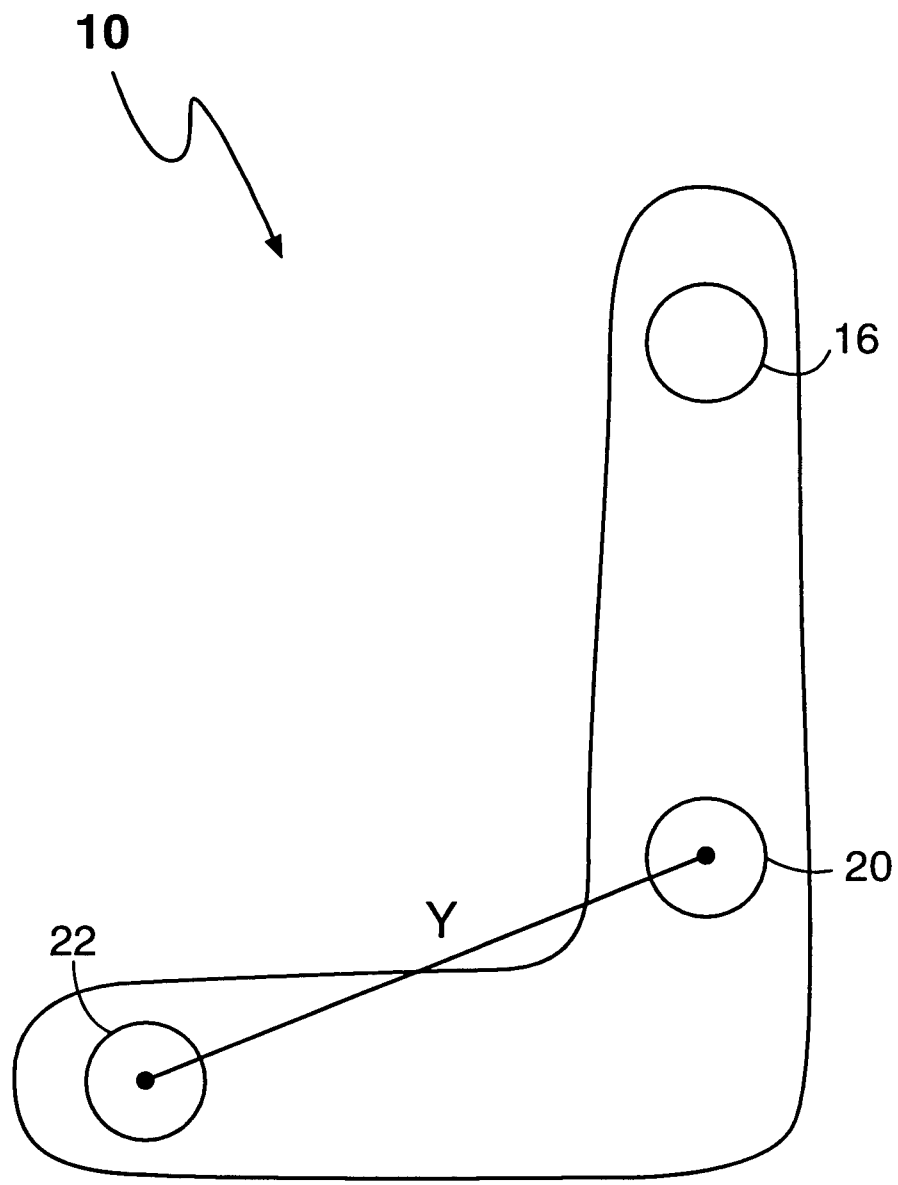
FIG. 2 is another embodiment of a electromagnetic gradiometer of the present invention showing asymmetrical locations for the receiver coils.

Note that, as shown in FIG. 2, the receiver coils 20,22 and the transmitter coil 16 do not need to lie along a single line, nor do they need to be horizontally aligned. Further, the receiver coils 20,22 need not be located symmetrically about the transmitter coil 16. Any combination of receiver coil configurations and locations that satisfy equation 3 will suffice, if the receiver coils 20, 22 are opposite in sense.

Whatever the physical location of the receiver coils 20,22, there will be known distance Y between the first receiver coil 20 and the second receiver coil 22. In FIG. 1, distance Y is equal to $d_1$ plus $d_2$. In FIG. 2, distance Y is as shown. Based on this distance Y, and the signal channel, the electromagnetic gradient may be determined by dividing the secondary electromagnetic field strength indicated by the signal channel by the distance Y. A math unit 36, such as a simple microprocessor or any other electronic component suitable for processing data may be supplied with the signal channel and the value of Y and used to calculate the electromagnetic gradient between the location of the first receiver coil 20 and the second receiver coil 22. The units of electromagnetic gradient are typically expressed as galiss/meter.

The reference channel for the gradiometer 10 may be generated by either of the receiver coils 20,22; it need not be generated by the first receiver coil 20.

Figure 3:
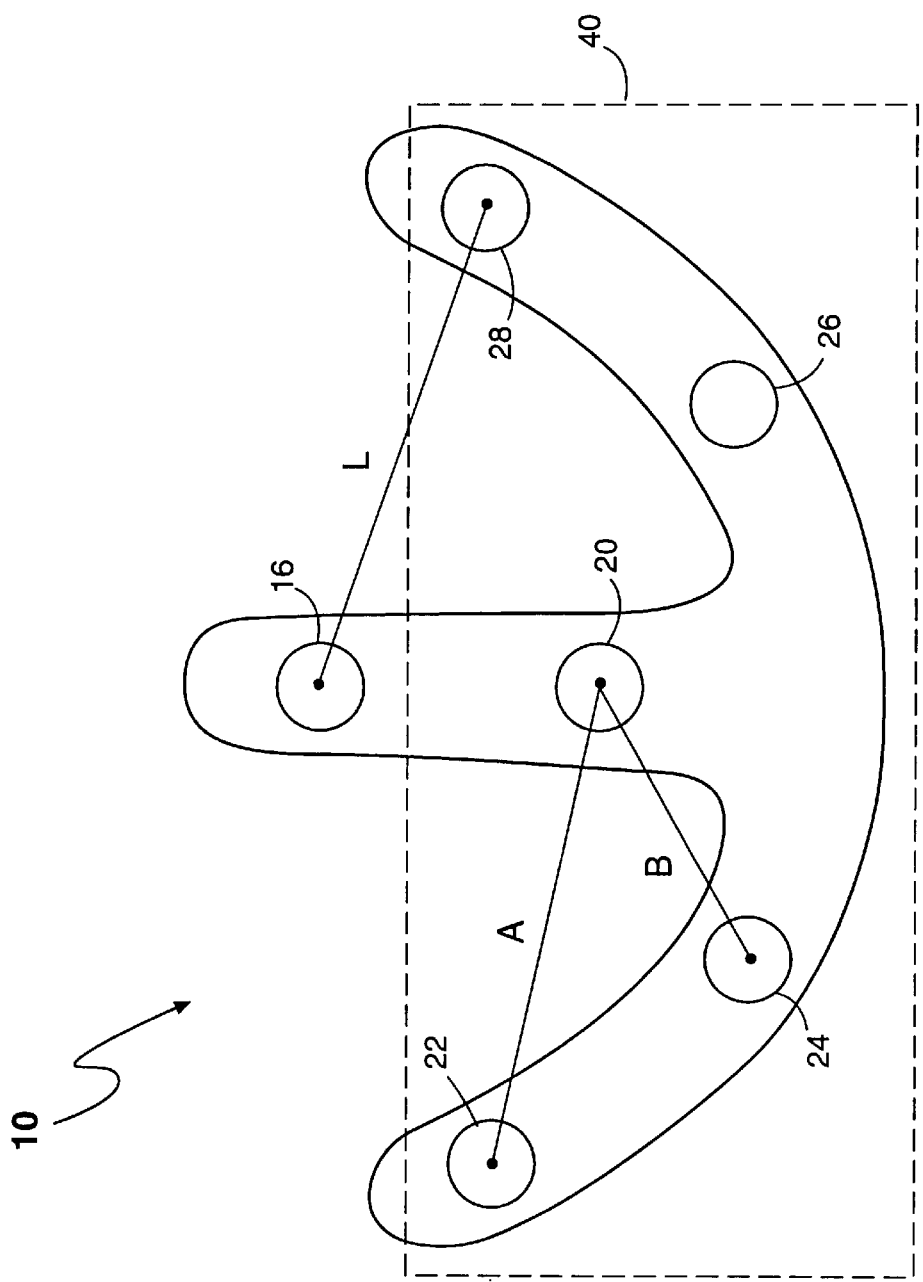
FIG. 3 is another embodiment of a electromagnetic gradiometer of the present invention showing an array of receiver coils.

In another embodiment of the present invention, an array of receiver coils 40 may be used. An example of such an arrangement is shown in FIG. 3. In the gradiometer 10 of FIG. 3, the first receiver coil 20 is on the same side of the transmitter coil as the other receiver coils 22,24,26,28. The other receiver coils 22,24,26,28 are preferably arrayed so as to be equidistant from the transmitter coil 16; that is, the distance L from each of the receiver coils 22,24,26,28 (other than the first) to the transmitter coil 16 is the same. An example of suitable coil configurations would be the following:

|  | Distance from Transmitter Coil | Number of Turns | Coil Area |
| --- | --- | --- | --- |
| Option A |  |  |  |
| First Receiver Coil | 10 | 150 | 20 |
| Other Receiver Coils | 15.874 | 400 | 30 |
| Option B |  |  |  |
| First Receiver Coil | 10 | 150 | 20 |
| Other Receiver Coils | 12 | 324 | 16 |

With the gradiometer 10 of FIG. 3, multiple electromagnetic gradients may be measured without moving the gradiometer 10. First, the first receiver coil 20 could be paired with receiver coil 22 to determine the electromagnetic gradient between the two, i.e., along the line marked A. Then the first receiver coil 20 could be paired with receiver coil 24 to determine the electromagnetic gradient between the two, i.e. along the line marked B. This pairing of the first receiver coil 20 to the remaining receiver coils 26, 28 could then proceed in a like manner. As shown in the schematic of FIG. 4, the receiver coil pairing could handled by switching which receiver coil output is supplied to the amplifiers 32,34 via a switch 50 in a manner well known in the art.

Figure 4:
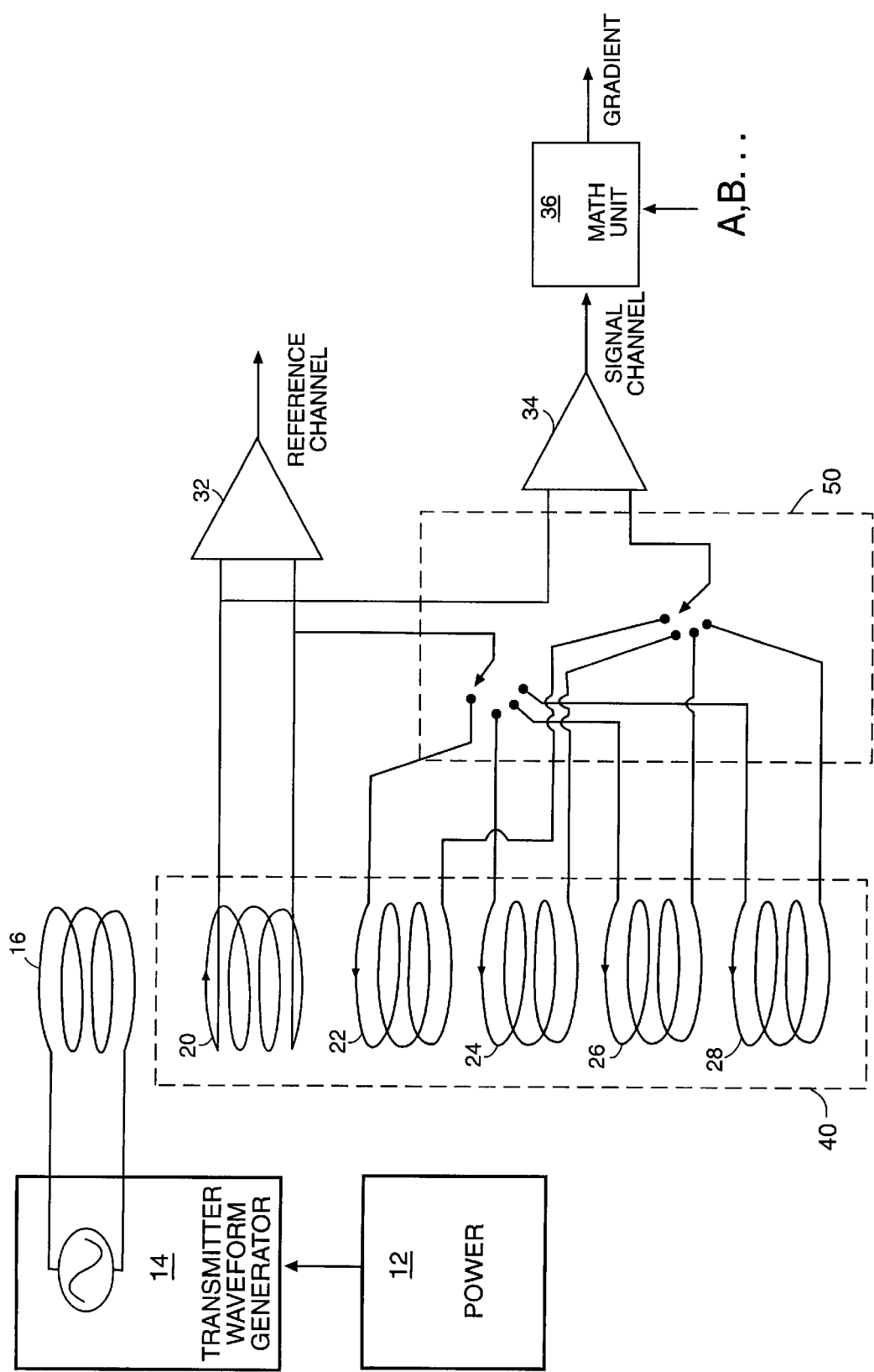
FIG. 4 is a schematic of the electromagnetic gradiometer of FIG. 3.

By selectively choosing which receiver coil 22,24,26,28 to match with the first receiver coil 20, the gradiometer 10 of FIGS. 3 and 4 is able to measure a plurality of electromagnetic gradients without being moved. A math unit 36 supplied with the switched signal channel and the respective distance values (A,B, etc.) may be used to calculate the electromagnetic gradient between the location of the first receiver coil 20 and the other receiver coils 22,24,26,28 by dividing the switched signal channel value by its respective distance value. It should be noted that electromagnetic field measurements at the receiver coil pair used (i.e., 20,22 or 20,24 or 20,26 or 20,28) should be taken at the same instant in time so that the primary electromagnetic field is properly nulled and the secondary electromagnetic field is properly measured. Thus, for the gradiometer 10 of FIGS. 3 and 4, four separate measurements would need to be taken, one for each pair, in order to calculate four different gradients without moving the gradiometer 10. Alternatively, a different electronic circuit could be used which would store the electromagnetic field strength at all five receiver coils 20,22, 24,26,28 at one instant in time and thereafter calculate the electromagnetic gradients based on the stored values.

It should be noted that although the preceding two paragraphs have described measuring a plurality of electromagnetic gradients without moving the gradiometer 10, a plurality of gradients may also be measured in conjunction with movement of the such gradiometers 10. That is, the present invention includes gradiometers 10 that move and those that are fixed.

Figure 5:
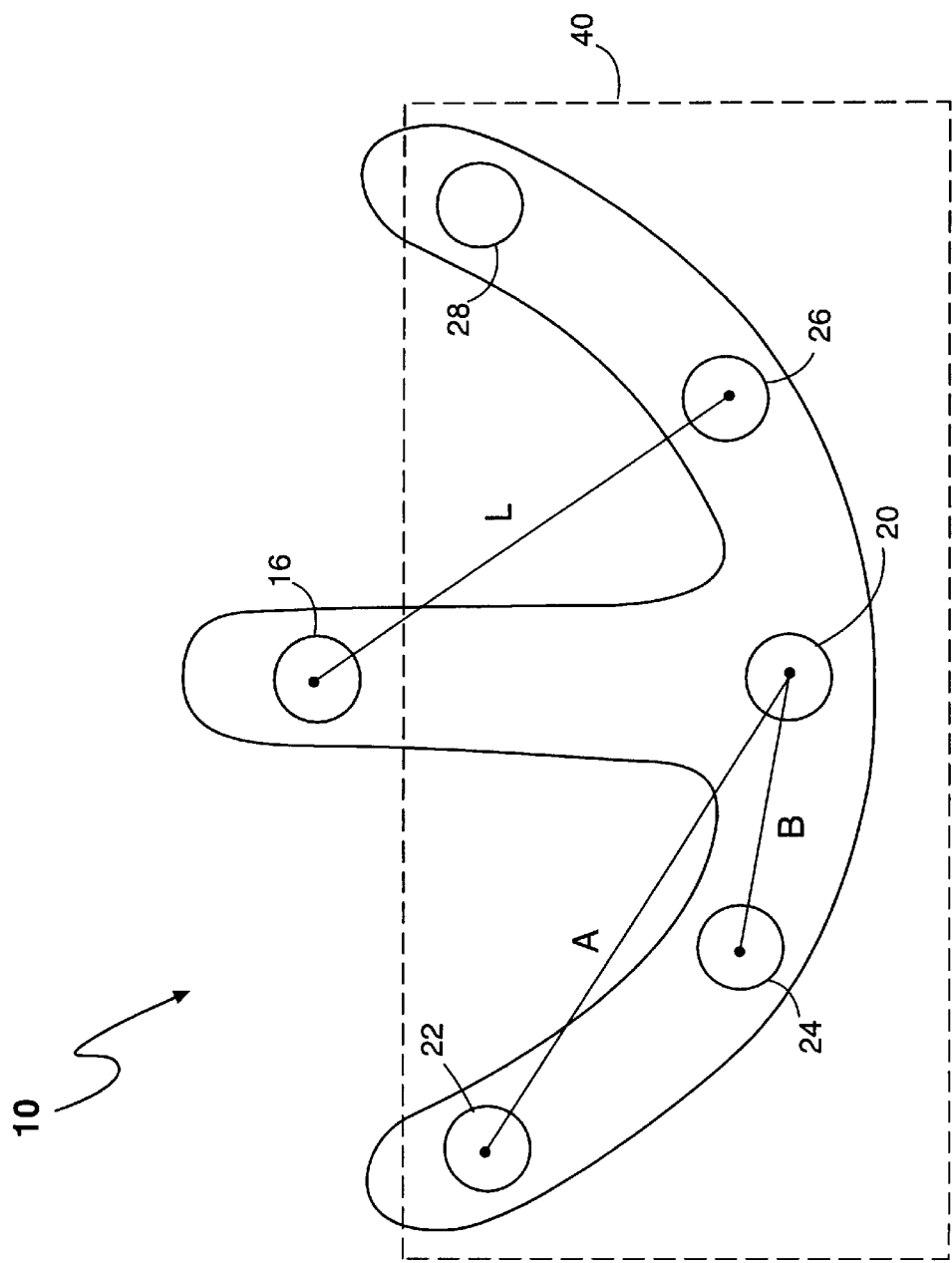
FIG. 5 is another embodiment of a electromagnetic gradiometer of the present invention showing an alternate location of receiver coils in an array.

Alternative arrangements of the array type gradiometer 10 may be used where the first receiver coil 20 is located similarly to the other receiver coils 22,24,26,28 as shown in FIG. 5.

The electromagnetic gradient measured by the present invention can be employed in various ways to identify characteristics and features of a hidden object. One approach to implementing the method entails compiling a library of gradient fields for a certain object. For example, in the case of a land mine, the library of electromagnetic gradient fields would be compiled based on empirical data and would include an plurality of land mine electromagnetic gradient fields wherein the electromagnetic gradient fields would be based on known land mine characteristics and features such as size and shape, material composition, magnetic permeability, and conductivity. The electromagnetic gradient fields would then be appropriately stored in the memory of a computer. By utilizing appropriate software designed to compare a manual or experimental electromagnetic gradient field with the full library of reference electromagnetic gradient fields, the software would detect corresponding anomalies and trends and by weighing and averaging the overall similarities, would be able to characterize or at least postulate as to the characteristics and features of the hidden object that is the subject of the experimental or measured electromagnetic gradient fields.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An electromagnetic field gradiometer, comprising:
   a) a transmitter for generating a time varying primary electromagnetic field and inducing a secondary electromagnetic field about a hidden object;
   b) a primary detector having a first sense and disposed at a first location for measuring the strength of the combined primary and secondary electromagnetic fields at said first location and for generating a first output based on said strength;
   c) a plurality of secondary detectors having a sense and disposed at a plurality of secondary locations for measuring the strength of the combined primary and secondary electromagnetic fields at said secondary locations simultaneously with the measurement of said combined primary and secondary electromagnetic field at said first location by said primary detector; wherein said sense of said secondary detectors is opposite said first sense; each of said secondary detectors generating a secondary output indicative of said strength of the combined primary and secondary electromagnetic fields at the respective secondary location;
   d) a logic circuit for selectively combining said first output with said secondary outputs; and
   e) wherein said electromagnetic gradiometer determines a plurality of gradients of said secondary electromagnetic field based on said combined first output and said selected secondary outputs and the distance between said first location and the respective secondary locations.

2. The electromagnetic gradiometer of claim 1 wherein said secondary locations are uniformly distant from said transmitter.

3. The electromagnetic gradiometer of claim 1 wherein said secondary locations and said first location are uniformly distant from said transmitter.

4. The electromagnetic gradiometer of claim 1 wherein said first detector has a first number of turns and a first area and wherein said secondary detectors have a second number of turns and a second area and wherein said first number of turns times said first area equals said second number of turns times said second area.

5. The electromagnetic gradiometer of claim 1 wherein said logic circuit includes a switch operatively connected to said secondary detectors.

6. The electromagnetic gradiometer of claim 1 wherein said primary detector and said secondary detectors are disposed collinearly.

7. The electromagnetic gradiometer of claim 6 wherein said primary detector and said secondary detectors are coplanar.

8. The electromagnetic gradiometer of claim 1 wherein said primary detector and said secondary detectors are coplanar.

9. The electromagnetic gradiometer of claim 1 wherein the magnetic field strength of said primary electromagnetic field measured by said primary detector is equal in magnitude, but opposite in sense, from the magnetic field strength of said primary electromagnetic field measured by at least one of said secondary detectors.

10. The electromagnetic gradiometer of claim 1 wherein:
    said secondary locations are uniformly distant from said transmitter;
    the magnetic field strength of said primary electromagnetic field measured by said primary detector is equal in magnitude, but opposite in sense, from the magnetic field strength of said primary electromagnetic field measured by at least one of said secondary detectors; and
    said logic circuit includes a switch operatively connected to said secondary connectors.

11. A method for measuring the gradient of an electromagnetic field, comprising:
    a) generating a time varying primary electromagnetic field;
    b) inducing a responsive time varying secondary electromagnetic field about a hidden object;
    c) measuring the strength of the combined primary and secondary electromagnetic field at a first detector to produce a first output and simultaneously measuring the strength of said combined primary and secondary electromagnetic field at a second detector to produce a second output, said second detector being spaced apart from said first detector by a first distance;

d) thereafter, measuring the strength of the combined primary and secondary electromagnetic field at said first detector to produce a third output and simultaneously measuring the strength of said combined primary and secondary electromagnetic field at a third detector to produce a fourth output, said third detector spaced apart from said first detector by a second distance and distinct from said second detector;

e) determining a first gradient of said secondary electromagnetic field based on said first output, said second output, and said first distance; and f) determining a second gradient of said secondary electromagnetic field based on said third output, said fourth output, and said second distance.

12. The method of claim 11 wherein said generating a time varying primary electromagnetic field is performed by a transmitter coil.

13. The method of claim 12 wherein said first detector is disposed closer to said transmitter coil than said second detector is to said transmitter coil.

14. The method of claim 12 wherein said second detector and said third detector are spaced approximately equally distant from said transmitter coil.

15. The method of claim 11 wherein said first detector has a first number of turns and a first area and wherein said second and third detectors have a second number of turns and a second area and wherein said first number of turns times said first area equals said second number of turns times said second area.

16. The method of claim 11 further comprising combining said first output and said second output so as to null said primary electromagnetic field.

* * * * *